US005524132A

United States Patent [19]
Ranadive

[11] Patent Number: 5,524,132
[45] Date of Patent: Jun. 4, 1996

[54] PROCESS FOR REVEALING DEFECTS IN TESTPIECES USING ATTENUATED HIGH-ENERGY X-RAYS TO FORM IMAGES IN REUSABLE PHOTOGRAPHS

[75] Inventor: Nandakumar N. Ranadive, Wappingers Falls, N.Y.

[73] Assignee: International Business Machines Corporation, Armonk, N.Y.

[21] Appl. No.: 439,737

[22] Filed: May 12, 1995

[51] Int. Cl.⁶ ................................................. G01B 15/06
[52] U.S. Cl. ............................ 378/58; 378/185; 250/337
[58] Field of Search ................................. 378/58, 62, 98, 378/156, 185; 250/337, 580, 587

[56] References Cited

U.S. PATENT DOCUMENTS

| | | | |
|---|---|---|---|
| 3,582,653 | 6/1971 | Howard | 250/337 |
| 3,924,127 | 12/1974 | Cheret et al. | 378/185 X |
| 4,809,308 | 2/1989 | Adams et al. | 378/99 |
| 4,926,452 | 5/1990 | Baker et al. | 378/22 |
| 4,951,305 | 8/1990 | Moore et al. | 378/154 X |
| 5,311,032 | 5/1994 | Montoro et al. | 250/584 |
| 5,357,118 | 10/1994 | Fukuoka et al. | 250/582 |

FOREIGN PATENT DOCUMENTS

| | | |
|---|---|---|
| 6018450 | 1/1994 | Japan . |
| 6003136 | 1/1994 | Japan . |

OTHER PUBLICATIONS

IEEE Transactions on Components, Packaging and Manufacturing Tech. Part B, vol. 17, No 3, Aug. 1994—"The Importance of Material Selection For ... Assemblies" by G. O'Malley et al, pp. 248–255.

Primary Examiner—David P. Porta
Attorney, Agent, or Firm—Bernard M. Goldman

[57] ABSTRACT

A process and apparatus for revealing manufacturing defects in testpieces, such as printed circuit boards, by passing through high-intensity attenuated x-rays (above 150 Kilo-Volts) to reusable photo plates for revealing defects in the testpieces. The x-rays are angled from 35 to 50 degrees for generating images of defects within thick multilayered printed circuit boards. During exposure, a thin lead sheet is placed between the testpiece and a phosphor photographic plate on a side of the testpeice opposite the x-ray gun. The lead sheet uniformly attenuates the high-energy x-rays to the captured image before they reach the phosphor plate to avoid damage to the photographic reuse of the plate and prevent over-exposure without loss of image contrast in the phosphor photograph. The exposed phosphor plate is excited with a low energy monochromatic radiation to visually activate the latent x-ray image in the exposed plate. The activated image is received by an analog-to-digital converter which digitizes the image into digital signals that are formed into a data file. The data file of the digitized image is stored in a digital computer for display on a computer display device. Then, the image is erased by an ultra-violet lamp, and the phosphor plate is reused for later photographs of other boards. The data file provides a permanent way to maintain the visual quality of the x-ray captured image which would otherwise rapidly deteriorate.

4 Claims, 3 Drawing Sheets

PROCESS FOR REVEALING DEFECTS IN TESTPIECES USING ATTENUATED HIGH-ENERGY X-RAYS TO FORM IMAGES IN REUSABLE PHOTOGRAPHS

The present invention relates to a process and apparatus for revealing manufacturing defects in testpieces by using high-intensity attenuated x-rays on reusable photographs.

BACKGROUND OF THE INVENTION

Problems of storage phosphor maintenance and deterioration are addressed in U.S. Pat. No. 5,311,032 issued May 10, 1994 to Montoro et al, which describes a system that uses low-intensity (low-voltage) medical x-rays angled perpendicular to a human subject being photographed on a phosphor photographic medium. After the medium is x-ray exposed, the latent x-ray image is radiated with a helium neon gas laser to detect and readout the captured image in the plate to a computer screen for viewing. This patent uses x-rays on humans in the medical field. The x-ray energies used for human exposure are in the range of 30 to 100 KV, because energies above 120 KV are damaging to the human tissue. Such low radiation energies are very limiting in the industrial field, especially when used to detect solder defects and other internal defects in electronic assemblies such as printed circuit boards. This patent uses a storage phosphor imaging system disclosed in U.S. Pat. No. RE 31,874 to Luckey reissued on Mar. 12, 1985, in which storage phosphor is exposed to x-rays transmitted through an object, such as body parts of a human and are stored as latent x-ray images which are read by stimulating the storage phosphor with a relatively long wave-length monochromatic radiation. Upon stimulation, the storage phosphor releases stored energies in the form of radiation of intermittent wavelength in the visible range. Intensities of this radiation are proportional to the stored energies. This radiation is directed to a photomultiplier tube (PMT) for recording purposes. To obtain useful images, the stimulating radiation is scanned in a raster fashion.

SUMMARY OF INVENTION

An object of the invention is to provide a process that uses high-intensity x-rays (above 150 Kilo-Volts) for revealing defects in manufactured items, such as printed circuit boards. Low-intensity x-rays (30 to 100 Kilo-Volts) used for photographing human and animal body parts were found ineffective in revealing defects in multilayer printed circuit boards.

Another feature of the invention is the use of non-perpendicularly-angled high-intensity x-rays to reveal specially located defects within multilayer circuit boards. The invention uses an X-ray path obliquely angled through a circuit board in the range of 30 to 70 degrees from a line perpendicular to a surface of the circuit board for revealing internal defects located within holes through the circuit board. This feature is important because it was found that perpendicularly angled x-rays do not reveal defects in a component which is located above or below another component in a multilayer printed circuit board.

Still another feature of the invention is avoid destruction by high-intensity x-rays of the photographing ability of phosphor plates. High-intensity x-rays significantly differ from low-intensity x-rays in their affect on the photographing ability of phosphor plates, since the former maintains photographing reuse but the latter may destroy photographing reuse.

This invention requires x-rays having high voltage intensities in the range from about 150 KV (kilovolts) up to about 180 KV. The direction of the x-rays is angled from 35 to 50 degrees for generating images of defects within thick multilayered printed circuit boards. After board exposure, X-ray attenuation is obtained by placing a thin lead sheet between the board and the phosphor photographic plate on the side of the board opposite the x-ray gun. The lead sheet uniformly attenuates the transmitted high-energy x-rays in the captured image before it reaches the phosphor plate to avoid damage to the photographic reuse of the plate and prevent overexposure. Since the lead sheet uniformly reduces the exposed x-ray energies, there is no loss of image contrast in the phosphor photograph. Then the used phosphor plates may be erased by ultra-violet light, allowing the same plate to be reused for many different photographs.

Then the exposed phosphor plate is excited with a low energy monochromatic radiation (such as a He-Ne laser) which visually activates the latent x-ray image in the exposed phosphor plate. Next, the activated image in the plate is received by an analog-to-digital converter which digitizes the image into digital signals that are formed into a data file of the image. The digitized image is stored in a digital computer and displayed on a computer display device.

After generating the data file, the image in the phosphor plate may be erased by an ultra-violet lamp, to enable reuse of the plate for later photographs of other boards. The data file provides a permanent way to maintain the visual quality of the x-ray captured image. The phosphor cannot permanently retain the captured image without significant deterioration in a relatively short time.

DESCRIPTION OF THE DRAWINGS

The method and apparatus of the invention may be further understood by reference the Figures appended hereto.

DESCRIPTION OF THE PREFERRED EMBODIMENT

Figure 2:
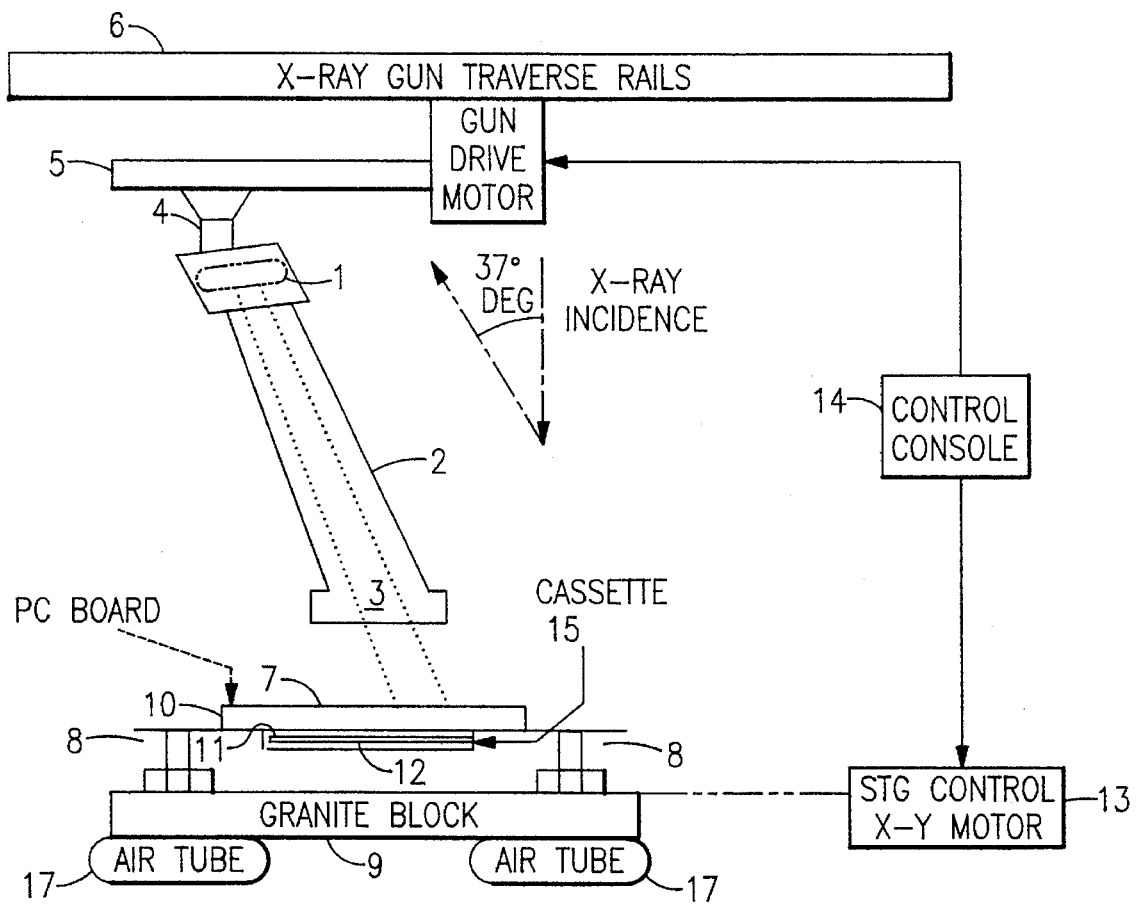
FIG. 2 is a schematic diagram of a preferred embodiment of the invention in which a circuit board is exposed to an oblique beam of x-rays, after which the x-ray image is attenuated by a lead sheet before reaching a phosphor photographic plate.

FIG. 2 shows a schematic layout for x-ray apparatus 1 which is set-up to photograph defects in a printed circuit board 7 on a reusable phosphor plate 12. The X-ray gun 1 is mounted on a pivot base 4 which allows x-rays 3 from gun 1 to be obliquely angled relative to a line perpendicular to a surface of board 7, the preferred x-ray angle being 37 degrees. Pivot base 4 allows adjustment of the gun in a circular pattern to give the operator flexibility to accommodate various types of circuit boards. Pivot base 4 is mounted on X-Y rails 5 and 6 that provide the gun with two dimensional planar motion parallel to the surface of the work piece (printed circuit board). A collimator 2 surrounds x-rays 3 and is fastened to the supports of gun 1. Collimator 2 is made of stainless steel and is internally lined with lead.

Printed circuit board 7 is placed on a metal table 10 which is supported by stand-offs 8 over a granite block 9. A cassette 15 is supported on the bottom side of table 10 above granite block 9. Phosphor photographic plate 12 is supported in cassette 15, and a uniformly thin lead sheet 11 lays on top of plate 12 to attenuate x-rays which have passed through board 7 before reaching the phosphor photographic plate 12. Plate 12 in cassette 15 is placed next to the work piece to prevent blurring in the photographed image. Cassette 15 contains storage phosphor plate 12 and the lead screen 11 positioned on top of the storage phosphor plate 12 in the cassette. The thickness of the lead sheet depends on the exposure intensity.

Thus, the testpiece support assembly (comprised of items 7, 10 and 15) is mounted on granite block 9 which is driven in X-Y directions by a stage control motor 13. The stage control motor 13 is controlled by a control console 14, which also controls the movements of gun 1. The console 14 is located outside of the room containing the previously described x-ray affected items to allow a human operator of console 14 to be isolated from the x-rays. A close circuit TV (not shown) in the work room, allows the operator to position the testpiece support assembly containing circuit board 7, and to align gun 1, in proper positions.

Once the proper gun alignment and table positions are achieved, they can be held fixed, while the granite table 9 is indexed in the X-Y directions in predetermined steps to bring different areas of circuit board 7 into the x-ray path if board 7 has a larger area to be tested than the area covered by the x-ray path. Depending on the characteristics of gun 1, the maximum area of board 7 exposed for one photographic shot may be limited to a small area, such as a 4 inch square area, determined by the fanout size of collimator 2.

The granite table 9 is supported on air shocks 17, to dampen floor vibrations. This is critical since for longer exposures, vibrations can cause a blur in the image, thus reducing its quality. In addition, spherical defects may cause an inherent degradation of the image at the edges. Hence it is important to eliminate any additional sources which could degrade image quality.

The x-rays are turned on from the control console 14 prior to a photographing session to allow gun 1 to warm up for a predetermined time. After about a 30 minute warm-up, the subject process can begin.

X-rays 3 generated by gun 1 are funnelled through the collimator 2 to strike the area of board 7 at the 37 degree oblique angle. The high intensity X-ray energies from gun 1 may be varied over a range to adjust for complexities in the design of different types of circuit boards 7. Higher energies are required for thicker boards and/or board assemblies having several internal board layers or planes.

The exposure step involves exposing the circuit board to x-ray energy for a predetermined time, and the level and duration is determined by the board thickness and the type of defects sought. In the preferred embodiment, the voltages used ranged from 90 to 150 KV. Due to high KV used in the expose process, this step of the process was carried out with the human operator at remote console 14 outside the work room.

Since high intensity x-ray energies are used in this apparatus (almost twice those used in the medical field), it is possible to cause irreversible damage to the storage phosphor in photo plate 12. In the described embodiment, the circuit board has several internal copper planes, which reduce the amount of x-ray energy reaching the storage phosphor in plate 12 even though high intensity x-rays are being used. The exposure damage risk to photo plate 12 is avoided by using the thin lead sheet 11 to cover storage phosphor plate 12. Screen 11 uniformly reduces the x-ray energy reaching storage phosphor plate 12, and will therefore cause very little, if any, loss of contrast in the captured image. Lead sheets of varying thickness's are commercially available for exposing conventional x-ray films.

The captured image stored in phosphor photo plate 12 reveals defects existing in board 7. This defect-revealing image in plate 12 is read by the digital read-out assembly shown in FIG. 3. To do this after exposure, phosphor plate 12 is loaded into another cassette 15 for having its latent image computerized. A monochromatic laser light from a He-Ne laser is used to excite the phosphor in plate 12 to make the x-ray induced image visible. The image then gets digitized so it can be viewed by a detector. In this embodiment, in order for the images made with storage phosphor to be acceptable, a visual comparison of the image clarity was made with the x-ray images previously obtained on a conventional x-ray film. The calibration of solder void defects occurring in plated through holes in board 7 is done in a similar manner. Defects in dummy test pieces are x-rayed and the exact dimensions of the defects are determined via cross sections through them. Acceptance criteria are set based on these dimensions. These x-rays of dummy test pieces are used as standards for accepting or rejecting production parts.

Figure 3:
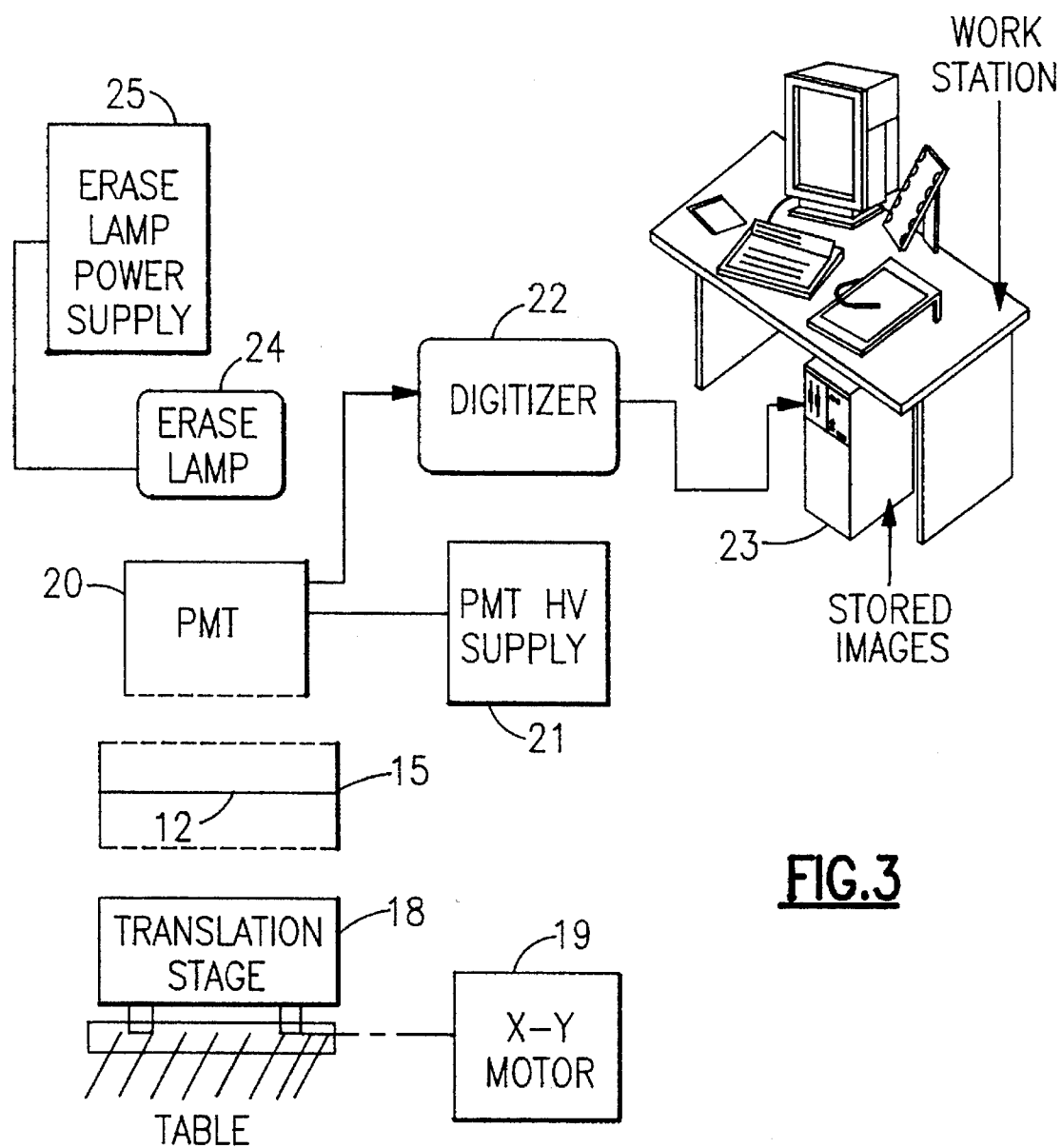
FIG. 3 is a schematic diagram of an arrangement for digitizing the latent x-ray image, and then erasing the image to permit reuse of the phosphor photographic plate for another photograph. The digitized images are displayed and/or stored on electronic media of a computer system.

Thus in FIG. 3, the storage phosphor plate 12 in cassette 15 is mounted between a translation stage 18 and a Photo Multiplier Tube 20 (PMT). The translation stage assembly contains a read-out laser which provides light which excites the x-ray exposed phosphor in plate 12 to make its x-ray induced image readable by a light detector.

A stage drive motor 19 moves stage 18 in precise increments. Readout optics are mounted in translation stage assembly 18 and scan the exposed image in a raster fashion.

The light readout excitation of the phosphor in plate 12 generates radiation in the visible range which is captured by PMT 20. The analog light intensities are detected and digitized by a digitizer 22 and recorded by a computer 23 at a work station. The digitized image may be stored on magnetic disk or tape, or on optical disk by the computer in the conventional manner. Images of defects used as standards can also be stored on such tapes or disks and may be used for automated comparison. A pass/fail criteria can be programmed based on the size and distribution of defects to accept or reject production parts. In the present embodiment, the images are inspected on the visual display in the computer facility.

After the images are digitized, inspected and stored, the x-ray captured image is erased from storage phosphor plate 12 by exposing it to the rays from an ultra-violet lamp 24 for a predetermined length of time. Once erased, the storage phosphor plate 12 can be re-used for a new photographic exposure.

Also, the storage phosphor plate can be erased by exposing it to the ultra-violet radiation if the quality of image is initially found unacceptable for visual inspection. If the images are acceptable, the plate is erased after the digitizing and inspection are complete.

Figure 1:
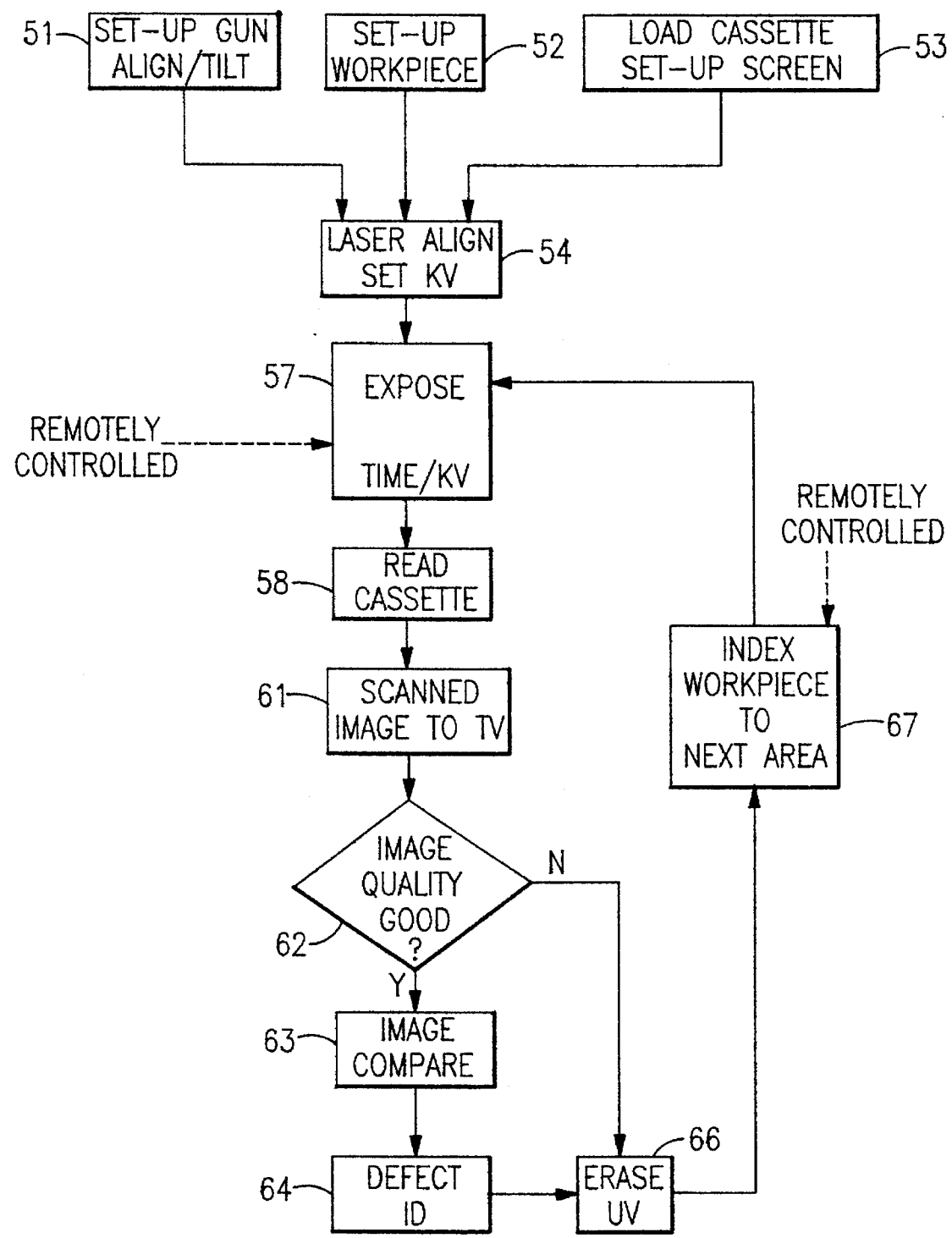
FIG. 1 is a flow chart representing steps used in a preferred embodiment of the invention.

The flow diagram of FIG. 1 represents the novel process. It starts by performing steps 51, 52 and 53. In step 51, the x-ray gun is set up and aligned at the required tilt angle. In steps 52 and 53, the board 7 and cassette 15 are respectively positioned above and below table 10 in alignment with each other; and the X-Y motor 13 is operated to position adjustable table 10 to align the angled x-ray path with a selected test area (e.g. 4×4 inches) of the circuit board 7, and with a corresponding area of photo plate 12. For example, the board 7 may have a size of 24×26 inches. Only one area (4×4 inches) of board 7 is to be x-ray exposed in the current set-up. The plate 12 may have the same or a different size than the test piece 7 or screen 11.

The area to be exposed in plate 12 must be aligned with the area in board 7 to be exposed to the x-rays, and this is done in step 54. A laser may be used for controlling this area alignment operation to select and position the area of the testpiece to be exposed. The voltage of gun 1 is also set here.

Step 57 is actuated to expose the aligned board and plate area to the x-rays for a predetermined time at the set KV.

In step 58, the plate 12 is removed from the x-ray table and put in a read cassette for performing the readout operations previously explained in regard to FIG. 3. Then step 61 scans the image in plate 12, digitizes it and computerizes it into a digital data file and displays it on the TV like display of the computer. It is then stored in the computer's memory.

In step 62, a human decision is made to examine the quality of the digitized image to determine if the computerized image can be used to check for defects. If the images has good quality, the yes (Y) exit is taken from step 62 to step 63, in which the image is compared to similar images of non-defective boards 7 or those of standard defects, to determine if the defect is rejectable. In step 64, any rejectable defects found are identified for subsequent repairs. Then step 66 is entered to use ultra-violet light to erase the image in the phosphor of the plate 12 so it can be reused for a new photograph.

If in step 62, if the image quality is found to be too bad to reliably check for defects, then the no (N) exit from step 62 is directly taken to step 66 to erase plate 12 for reuse.

After erasure step 66 is completed, step 57 may be reentered to perform another photographic operation using the same recycled plate 7. Thus, step 57 is reentered after each 4 inch square area of the board is photographed by an x-ray exposure and its captured image is stored in a digitized computer data file.

The next area is selected before executing step 57, for which the X-Y motor 13 is controlled to move both the board and an erased plate to the next area in the testpiece 7 to be photographed.

The looping back to step 57 is repeated for each next area until all required areas are photographed, and digitized. This may include any or all of the areas on board 7. The total exposure of plate 12 is then complete, when all required areas of board 7 have been digitized.

It should be understood that the embodiment described herein has been provided by way of example and not by way of limitation. In light of the foregoing description, many modifications and variations which do not depart from the scope and spirit of the invention is defined by the appended claims.

Having thus described my invention, what I claim as new and desire to secure by Letters Patent is:

1. A process for revealing a defect in a testpiece from viewing an x-ray photograph of the testpiece, comprising the steps of:

positioning an x-ray source to beam x-ray radiation at an oblique angle to a surface of a testpiece for revealing the defect in a component positioned above another component in a hole in the testpiece, supporting a phosphor photographic plate on an opposite side of the testpiece from the x-ray source, and aligning an area of the phosphor photographic plate with an area of the testpiece to receive the x-ray radiation, locating an x-ray attenuation screen between the testpiece and the phosphor photographic plate, and adjusting the intensity of the x-rays to a high value that forms an image of the defect during penetration of the testpiece and that maintains the image during reduction of x-ray energies in the attenuation screen to generate an x-rayed photograph of the image in the phosphor photographic plate for which the reduction enables recycling of the phosphor photographic plate in making future x-rayed photographs.

2. A process for revealing a defect in a testpiece from viewing an x-ray photograph of the testpiece as defined in claim 1, in which the testpiece comprises a printed circuit board.

3. A process for revealing a defect in a testpiece from viewing an x-ray photograph of the testpiece as defined in claim 2, in which the attenuation screen comprises a thin lead sheet.

4. A process for revealing a defect in a testpiece from viewing an x-ray photograph of the testpiece as defined in claim 3, the process further comprising:

applying detectable radiation to the phosphor photographic plate to enable detection of the contained x-rayed photograph of the image, detecting the image contained in the x-rayed photograph by sensing the applied detectable radiation, video processing the detected image to produce a video image of the x-rayed image, digitizing the video image into a computer file representing the image, and displaying the video image on a computer display device to enable observation of the defect in the testpiece.

* * * * *